United States Patent
Bodtker et al.

(10) Patent No.: US 9,618,053 B2
(45) Date of Patent: Apr. 11, 2017

(54) UNIVERSAL JOINT

(71) Applicant: Steering Solutions IP Holding Corporation, Saginaw, MI (US)

(72) Inventors: Joen C. Bodtker, Gaines, MI (US); Gregory D. Brzezinski, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 14/276,347

(22) Filed: May 13, 2014

(65) Prior Publication Data

US 2015/0330456 A1    Nov. 19, 2015

(51) Int. Cl.
  *F16D 3/42* (2006.01)
  *F16D 3/12* (2006.01)
  *F16D 3/38* (2006.01)

(52) U.S. Cl.
  CPC ............... *F16D 3/12* (2013.01); *F16D 3/38* (2013.01); *F16D 3/42* (2013.01)

(58) Field of Classification Search
  CPC ..... F16D 3/12; F16D 3/38; F16D 3/42; F16D 3/43
  USPC ........................... 464/114, 125, 136
  See application file for complete search history.

(56) References Cited

U.S. PATENT DOCUMENTS

| | | | | |
|---|---|---|---|---|
| 1,216,508 | A | * | 2/1917 | Spade .......................... 464/125 |
| 2,997,864 | A | * | 8/1961 | Rueb |
| 4,498,888 | A | * | 2/1985 | Pastor ....................... 464/136 X |
| 4,579,546 | A | * | 4/1986 | Pastor ....................... F16D 3/38 464/136 X |
| 5,277,659 | A | * | 1/1994 | Cornay |

* cited by examiner

*Primary Examiner* — Gregory Binda
(74) *Attorney, Agent, or Firm* — Cantor Colburn LLP

(57) ABSTRACT

A universal joint assembly includes a hollow upper shaft having an inner surface, a lower shaft extending at least partially within the upper shaft, and a cage receiving at least a portion of the lower shaft, the cage positioned within the hollow upper shaft. The assembly further includes at least one upper tilt pin extending through the upper shaft and the cage, at least one groove formed in the inner surface of the upper shaft, and a lower tilt pin extending through the cage and the lower shaft. The lower tilt pin extends into the at least one groove.

10 Claims, 4 Drawing Sheets

UNIVERSAL JOINT

BACKGROUND OF THE INVENTION

The present invention relates generally to universal joints and, more particularly, to steering column universal joints having high torque or overload protection features.

Universal joints are typically used to transfer torque between two shafts. However, during high torque or overload conditions, the torque transferred through the universal joint may deflect universal joint components, which may result in component deformation or fracture, or cause components to separate from the universal joint.

Accordingly, it is desirable to provide a universal joint with features that maintain universal joint component integrity during high torque or overload conditions.

SUMMARY OF THE INVENTION

In an embodiment of the invention, a universal joint assembly is provided. The assembly includes a hollow upper shaft having an inner surface, a lower shaft extending at least partially within the upper shaft, and a cage receiving at least a portion of the lower shaft, the cage positioned within the hollow upper shaft. The assembly further includes at least one upper tilt pin extending through the upper shaft and the cage, at least one groove formed in the inner surface of the upper shaft, and a lower tilt pin extending through the cage and the lower shaft. The lower tilt pin extends into the at least one groove.

In another embodiment of the invention, a universal joint assembly includes a hollow upper shaft having an inner surface, a lower shaft extending at least partially within the upper shaft, and a cage receiving at least a portion of the lower shaft, the cage positioned within the hollow upper shaft. The assembly further includes a lower tilt pin extending through the cage and the lower shaft, an upper tilt pin extending through the upper shaft and the cage, and a groove formed in the upper tilt pin. The groove includes a side edge configured to interferingly engage the upper shaft inner surface.

In yet another embodiment of the invention, a universal joint assembly is provided. The assembly includes a hollow upper shaft having an inner surface, a lower shaft extending at least partially within the upper shaft, and a cage receiving at least a portion of the lower shaft, the cage positioned within the hollow upper shaft. The assembly further includes at least one upper tilt pin extending through the upper shaft and the cage, and a retention groove formed in the at least one upper tilt pin, the groove having a side edge configured to interferingly engage the upper shaft inner surface. The assembly further includes at least one groove formed in the inner surface of the upper shaft, and a lower tilt pin extending through the cage and the lower shaft. The lower tilt pin extends into the at least one groove.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
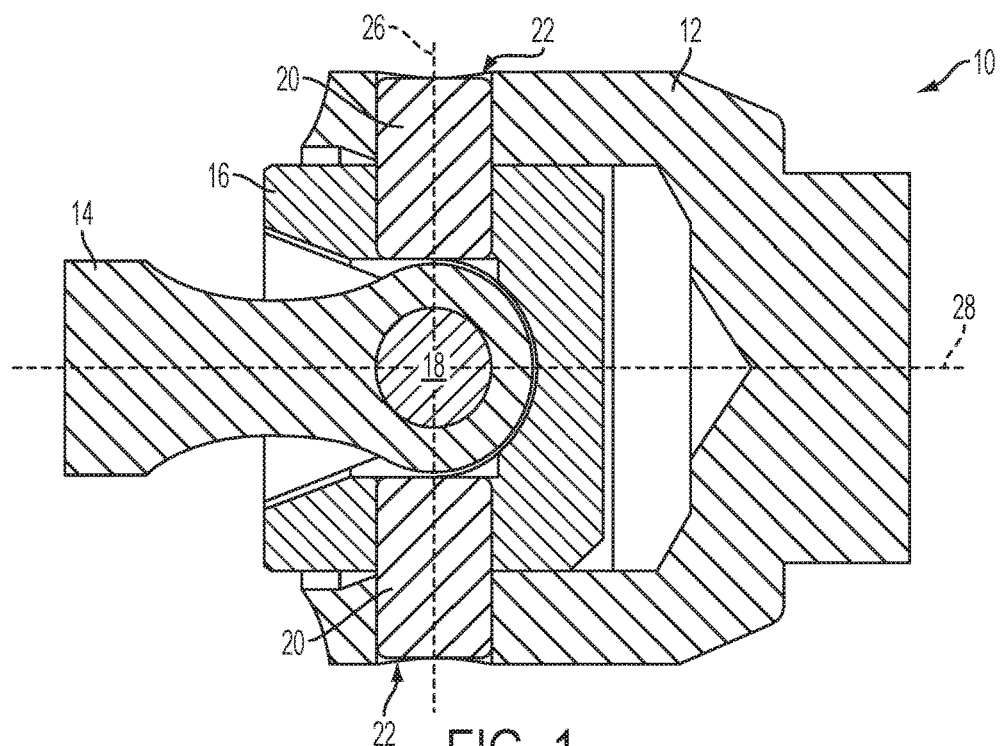
FIG. 1 is a side cross-sectional view of an exemplary embodiment of a universal joint assembly according to the disclosure.
Figure 2:
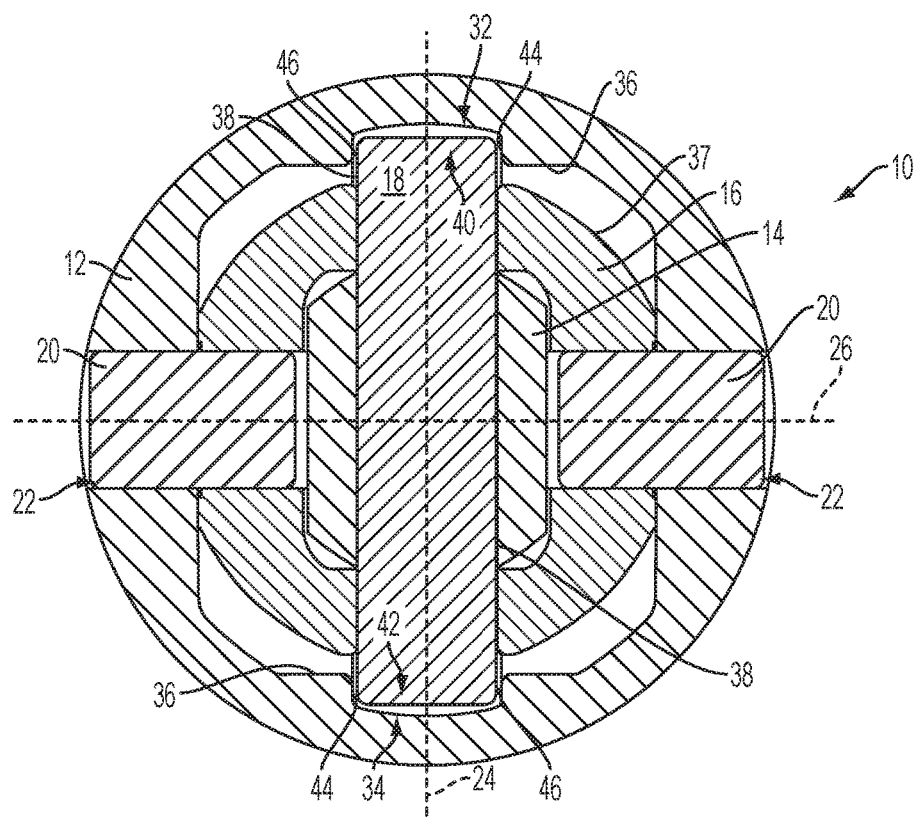
FIG. 2 is an axial cross-sectional view of the universal joint assembly shown in FIG. 1.

Referring now to the Figures, where the invention will be described with reference to specific embodiments, without limiting same, FIG. 1 illustrates a side cross-section of an exemplary universal joint assembly 10, and FIG. 2 illustrates an axial cross-section of universal joint assembly 10.

Universal joint (U joint) assembly 10 includes an upper shaft 12, a lower shaft 14, a cardan joint cage 16, a lower tilt pin 18, and upper tilt pins 20 extending through apertures 22 formed in upper shaft 12. Assembly 10 includes a first axis 24 (FIG. 2) that allows lower shaft 14 to pivot inside cage 16 and a second axis 26 that allows cage 16 to pivot inside upper shaft 12. Axes 24 and 26 are in one plane perpendicular to both each other and to a spin axis 28 (FIG. 1) of U-joint assembly 10. U-joint assembly 10 is pivotable to transmit torque from upper shaft 12 through cage 16 to lower shaft 14.

With continued reference to FIG. 2, upper shaft 12 includes a pair of opposed grooves 32 and 34 formed in an inner surface 36 of upper shaft 12. The pair of opposed grooves 32 and 34 extend from the inner surface 36 of the upper shaft 12 but do not extend completely through the upper shaft 12. Lower tilt pin 18 includes a sidewall 38, a first end 40 extending into groove 32, and an opposite second end 42 extending into groove 34. As shown, grooves 32, 34 are oriented 180° apart on shaft inner surface 36. However, grooves 32, 34 may be oriented at different angles with respect to each other. While a lower tilt pin may typically not extend beyond an outer edge or surface 37 of cage 16, in the exemplary embodiment, lower tilt pin 18 extends through cage 16 and into grooves 32, 34. Each of grooves 32, 34 includes a sidewall 44 that is spaced from tilt pin sidewall 38 under normal conditions to provide a rocking clearance 46 for lower tilt pin 18.

During normal operation, lower shaft 14 turns with upper shaft 12. If, for example, lower shaft 14 resists turning, it may produce a higher than normal torque through U-joint assembly 10. This may cause cage 16 to deflect and urge lower shaft 14 into contact with upper tilt pins 20. Such contact may result in a camming effect that presses upper tilt pins 20 out of upper shaft 12 through apertures 22.

Figure 3:
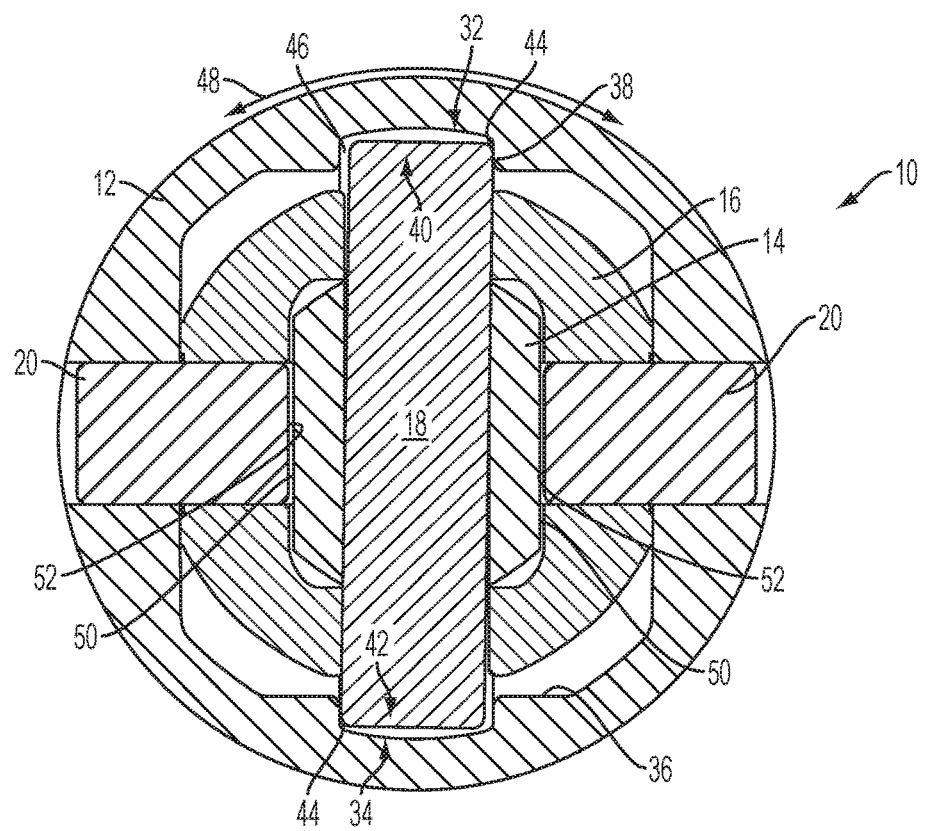
FIG. 3 is an axial cross-sectional view of the universal joint assembly shown in FIGS. 1 and 2 and under an overload condition.

However, assembly 10 is configured to prevent or counteract high torque loads from disengaging pins 20 or deforming cage 16. As shown in FIG. 3, during a high torque or overload condition (represented by arrow 48), upper shaft 12 rotates about spin axis 28 (FIG. 1) while lower shaft 14 resists rotation. As such, lower tilt pin sidewall 38 takes up at least a portion of clearance 46 and contacts groove sidewalls 44, which facilitates preventing further rotation of upper shaft 12 relative to lower shaft 14. This in turn facilitates preventing contact between an outer surface 50 of lower shaft 14 and an end surface 52 of each upper tilt pin 20, which may cause upper tilt pins 20 to be pushed out of upper shaft 12.

Figure 4:
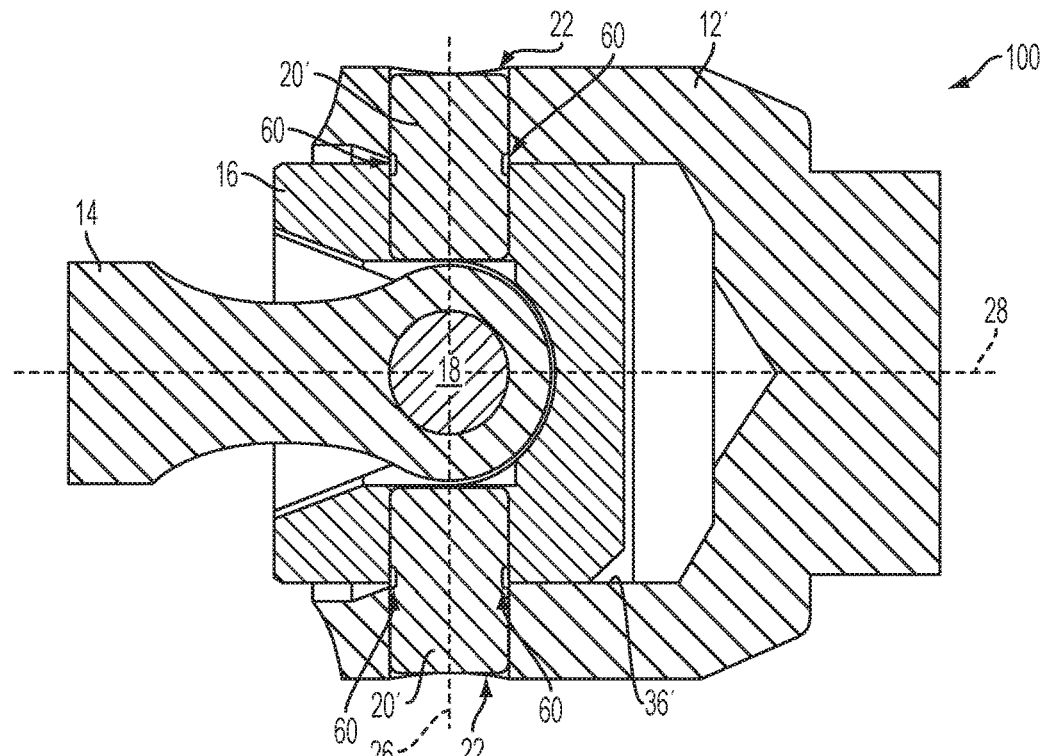
FIG. 4 is a side cross-sectional view of another exemplary embodiment of a universal joint assembly according to the disclosure.
Figures 5, 6:
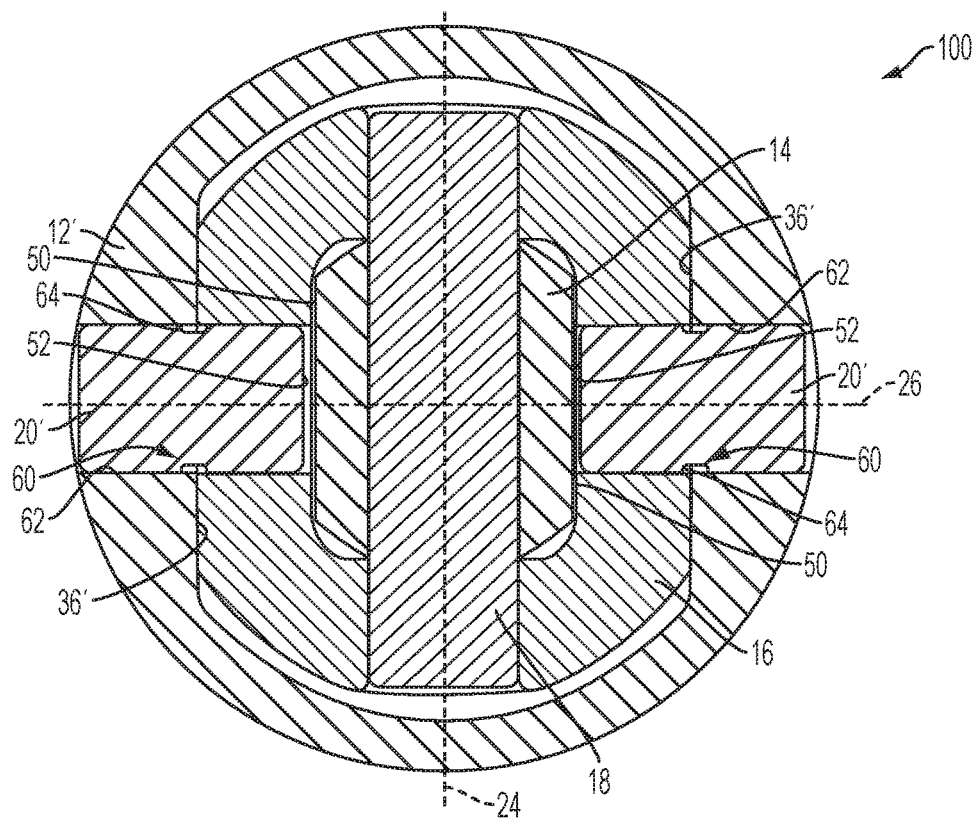
FIG. 5 is an axial cross-sectional view of the universal joint assembly shown in FIG. 4.
FIG. 6 is an axial cross-sectional view of the universal joint assembly shown in FIGS. 4 and 5 and under an overload condition.

FIGS. 4 and 5 illustrate a U-joint assembly 100 that is similar to the assembly 10 shown in FIGS. 1-3, except the upper tilt pins 20' include retention grooves 60. Like reference numerals indicate like parts. FIG. 4 illustrates a side cross-section of U-joint assembly 100, and FIG. 5 illustrates an axial cross-section of U-joint assembly 100.

In the exemplary embodiment, retention grooves 60 are oriented in proximity to the upper shaft inner surface 36' and an inner wall 62 that defines upper tilt pin apertures 22. Grooves 60 include an inner edge 64 that is configured to interferingly engage a portion of the upper shaft inner surface 36' during high torque or overload conditions, as described herein in more detail.

During normal operation, lower shaft 14 turns with upper shaft 12'. If, for example, lower shaft 14 resists turning, it may produce a higher than normal torque through U-joint assembly 100. This may cause cage 16 to deflect and urge lower shaft 14 into contact with upper tilt pins 20'. Such contact may result in a camming effect that presses upper tilt pins 20' out of upper shaft 12' through apertures 22.

Figure 7:
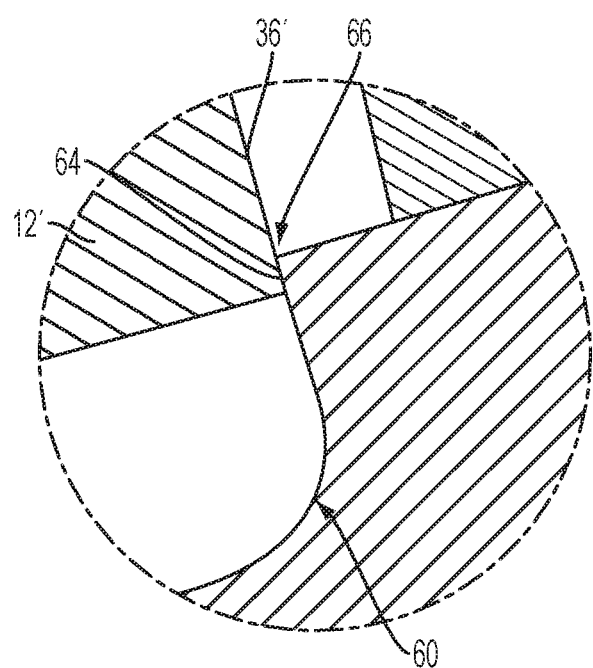
FIG. 7 is an enlarged view of a portion of the universal joint assembly shown in FIG. 6 and taken on section 7.

However, assembly 100 is configured to prevent or counteract pin disengagement due to high torque loads. As shown in FIGS. 6 and 7, during a high torque or overload condition (represented by arrow 48), upper shaft 12' rotates about spin axis 28 (FIG. 4) while lower shaft 14 resists rotation. Cage 16 is deflected and causes lower shaft 14 to contact upper tilt pins 20' with a force 'F' having both an axial and radial component on upper tilt pins 20' (as illustrated in FIG. 6). The axial component forces upper tilt pins 20' outward through apertures 22 while the radial component rotates or angles pins 20. Due to the rotation or angling of upper tilt pins 20', groove inner edge 64 catches or contacts upper shaft inner surface 36' as shown at a contact area 66. This facilitates preventing movement of upper tilt pins 20' out of apertures 22. With movement of upper tilt pins 20' halted, and as torque increases, lower shaft 14 contacts a corner 68 of upper tilt pins 20' and drives groove inner edge 64 to impinge into upper shaft inner surface 36'. This creates a mechanical stop or interference between upper tilt pins 20' and upper shaft 12' that prevents backing of upper tilt pins 20' out though apertures 22.

Although shown in different embodiments, U-joint assembly 10, 100 may include both grooves 32, 34 to accept ends 40, 42 of extended lower tilt pin 18, as well as retention grooves 60 formed in upper tilt pins 20.

A method of fabricating U-joint assembly 10 includes providing upper shaft 12 with inner surface 36, and forming grooves 32 and 34 in inner surface 36. Extended lower tilt pin 18 is provided with first end 40 that extends into groove 32 and second end 42 that extends into groove 34. Grooves 32, 34 and lower tilt pin 18 are sized to provide rocking clearance 46 therebetween. A method of fabricating U-joint assembly 100 includes providing upper shaft 12 and upper tilt pins 20, forming groove 60 in at least one upper tilt pin 20, and inserting upper tilt pins 20 into upper shaft.

Described herein are systems and methods for maintaining the integrity of a U-joint assembly during high torque or overload conditions. The U-joint assembly may include grooves formed in an inner surface of a shaft to receive the opposed ends of an elongated lower tilt pin. During high torque or overload conditions, the lower tilt pin engages sidewalls of the grooves to facilitate preventing engagement between a cage and upper tilt pins that could force the upper tilt pins out of the upper shaft. The assembly may alternatively or additionally include retention grooves formed in the upper tilt pins. During high torque or overload conditions, the inner edges of the retention grooves engage the upper shaft inner surface to facilitate preventing upper tilt pins being forced out of the upper shaft. Accordingly, the described features facilitate preventing over-rotation of the upper shaft relative to the lower shaft to maintain the integrity of the U-joint assembly during high torque or overload conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A universal joint assembly comprising:
a hollow upper shaft having an inner surface;
a lower shaft extending at least partially within the upper shaft;
a cage receiving at least a portion of the lower shaft, the cage positioned within the hollow upper shaft;
at least one upper tilt pin extending through the upper shaft and the cage;
a first groove and a second groove formed in the inner surface of the upper shaft but not extending through the upper shaft; and
a lower tilt pin extending through the cage and the lower shaft, the lower tilt pin having a first end extending into the first groove and a second end extending into the second groove.

2. The assembly of claim 1, wherein the first groove and the second groove are oriented 180° apart.

3. The assembly of claim 1, wherein the first and second ends extend beyond an outer edge of the cage.

4. The assembly of claim 1, wherein the at least one upper tilt pin is a first upper tilt pin and a second upper tilt pin.

5. A universal joint assembly comprising:
a hollow upper shaft having an inner surface;
a lower shaft extending at least partially within the upper shaft;
a cage receiving at least a portion of the lower shaft, the cage positioned within the hollow upper shaft;
at least one upper tilt pin extending through the upper shaft and the cage;
at least one groove formed in the inner surface of the upper shaft and does not extend through the upper shaft, the at least one groove having a groove sidewall; and
a lower tilt pin extending through the cage and the lower shaft, the lower tilt pin extending into the at least one groove and having a lower tilt pin sidewall spaced from the groove sidewall, in response to a high torque condition the lower tilt pin sidewall contacts the groove sidewall to prevent further rotation of the upper shaft relative to the lower shaft.

6. The assembly of claim 5, wherein the at least one groove comprises a first groove and a second groove formed in the inner surface of the upper shaft, the lower tilt pin having a first end extending into the first groove and a second end extending into the second groove.

7. The assembly of claim 6, wherein the first groove and the second groove are oriented 180° apart.

8. The assembly of claim 6, wherein the first and second ends extend beyond an outer edge of the cage.

9. The assembly of claim 5, wherein the at least one upper tilt pin is a first upper tilt pin and a second upper tilt pin.

10. The assembly of claim 5 wherein a rocking clearance for the lower tilt pin is provided by the groove sidewall spaced from the lower tilt pin sidewall.

\* \* \* \* \*